(12) United States Patent
Herrmann et al.

(10) Patent No.: US 11,353,107 B2
(45) Date of Patent: Jun. 7, 2022

(54) VALVE SYSTEM FOR A HYDRAULIC EMERGENCY TRAVEL GEAR FUNCTION OF AN AUTOMATIC TRANSMISSION FOR A MOTOR VEHICLE

(71) Applicant: ZF Friedrichshafen AG, Friedrichshafen (DE)

(72) Inventors: Markus Herrmann, Scheidegg (DE); Thilo Schmidt, Meckenbeuren (DE); Alexander Haberstock, Ravensburg (DE); Adriano Handrich, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/954,843

(22) PCT Filed: Dec. 17, 2018

(86) PCT No.: PCT/EP2018/085133
§ 371 (c)(1),
(2) Date: Jun. 17, 2020

(87) PCT Pub. No.: WO2019/121467
PCT Pub. Date: Jun. 27, 2019

(65) Prior Publication Data
US 2021/0088133 A1 Mar. 25, 2021

(30) Foreign Application Priority Data
Dec. 18, 2017 (DE) .................. 10 2017 223 015.0

(51) Int. Cl.
*F16H 61/12* (2010.01)
*B60K 17/02* (2006.01)
(Continued)

(52) U.S. Cl.
CPC ............ *F16H 61/12* (2013.01); *B60K 17/02* (2013.01); *B60K 17/04* (2013.01);
(Continued)

(58) Field of Classification Search
None
See application file for complete search history.

(56) References Cited

U.S. PATENT DOCUMENTS 6,398,684 B1    6/2002  Kaizu

FOREIGN PATENT DOCUMENTS

DE    19819780 A1 * 11/1998 ............. F16H 59/54
DE    10045556 A1 *  4/2001 ............. F16H 61/12
(Continued)

OTHER PUBLICATIONS

International Search Report (English Translation) PCT/EP2018/085133, dated Mar. 12, 2019, (2 pages).

*Primary Examiner* — Dirk Wright
(74) *Attorney, Agent, or Firm* — Dority & Manning, P.A.

(57) ABSTRACT

A valve system for a hydraulic emergency driving gear function of a hydraulic control unit for a motor vehicle automatic transmission includes a position valve (104) with a first piston slide (120) and an electromagnetic pressure regulator (86) having a decreasing characteristic curve. The first piston slide (120) is preloaded in a first position. When the first piston slide (120) is in a second position, the electromagnetic pressure regulator (86) is configured for connecting a system pressure-carrying line (18) of the motor vehicle automatic transmission to a first emergency driving gear clutch (12) of the motor vehicle automatic transmission and to a second emergency driving gear clutch (15) of the motor vehicle automatic transmission, whereby the first emergency driving gear clutch (12) and the second emergency driving gear clutch (15) are actuated, so that an
(Continued)

emergency driving gear of the motor vehicle automatic transmission is engaged.

19 Claims, 10 Drawing Sheets

(51) Int. Cl.
 *B60K 17/04* (2006.01)
 *F16H 61/00* (2006.01)
 *F16H 61/02* (2006.01)
 *G07C 5/08* (2006.01)
(52) U.S. Cl.
 CPC ..... *F16H 61/0021* (2013.01); *F16H 61/0206* (2013.01); *G07C 5/0808* (2013.01); *F16H 2061/1208* (2013.01); *F16H 2061/1232* (2013.01)

(56) References Cited

FOREIGN PATENT DOCUMENTS

| | | | | |
|---|---|---|---|---|
| DE | 10045556 A1 | | 4/2001 | |
| DE | 102005012586 A1 | * | 9/2006 | ............. F16H 61/12 |
| DE | 102005012586 A1 | | 9/2006 | |
| WO | WO 2006/097210 | | 9/2006 | |

* cited by examiner

| * = Filling Pres.<br>** < Threshold Pres.<br>+/- = 0.0-20.5 bar | Actuator Pressures | | | | | | | | | Clutch Pressures | | | | |
|---|---|---|---|---|---|---|---|---|---|---|---|---|---|---|
| Transmission Position | EDS NL | EMS A | EMS B | EMS C | EMS D | EMS E | EMS WK | EDS Sys | | A | B | C | D | E |
| P | +/- | 1** | 1* | 0 | 0 | 0 | 0 | 0 | | 1** | 1* | 0 | 0 | 0 |
| N1 | +/- | 1 | 1* | 0 | 0 | 0 | 0 | +/- | | 1 | 1* | 0 | 0 | 0 |
| R | +/- | 1 | 1 | 0 | 1 | 0 | +/- | +/- | | 1 | 1 | 0 | 1 | 0 |
| 1 | 0 | 1 | 1 | 1 | 0 | 0 | +/- | +/- | | 1 | 1 | 1 | 0 | 0 |
| 2 | 0 | 1 | 1 | 0 | 0 | 1 | +/- | +/- | | 1 | 1 | 0 | 0 | 1 |
| 3 | 0 | 0 | 1 | 1 | 1 | 1 | +/- | +/- | | 0 | 1 | 1 | 1 | 1 |
| 4 | 0 | 0 | 0 | 0 | 1 | 1 | +/- | +/- | | 0 | 1 | 0 | 1 | 1 |
| 5 | 0 | 0 | 0 | 1 | 1 | 0 | +/- | +/- | | 0 | 0 | 1 | 1 | 0 |
| 6 | 0 | 1 | 0 | 1 | 1 | 1 | +/- | +/- | | 1 | 0 | 1 | 1 | 1 |
| 7 | 0 | 1 | 0 | 0 | 1 | 0 | 0 | +/- | | 1 | 0 | 0 | 1 | 0 |
| 8 | 0 | 1 | 0 | 0 | 0 | 1 | 0 | +/- | | 1 | 0 | 0 | 0 | 1 |
| LHM1 | 1 | 0 | 0 | 0 | 0 | 0 | 0 | 1 | | 0 | 0 | 0 | 0 | 0 |
| LHM2 | 1 | 0 | 0 | 0 | 0 | 1 | 0 | 1 | | 0 | 0 | 1 | 1 | 1 |

Fig. 2

VALVE SYSTEM FOR A HYDRAULIC EMERGENCY TRAVEL GEAR FUNCTION OF AN AUTOMATIC TRANSMISSION FOR A MOTOR VEHICLE

CROSS-REFERENCE TO RELATED APPLICATION

The present application is related and has right of priority to WO Publication No. 2019/121467 filed on Dec. 17, 2018 and to German Patent Application No. 10 2017 223 015.0 filed on Dec. 18, 2017, which are incorporated by reference in their entirety for all purposes.

FIELD OF THE INVENTION

The invention relates generally to a valve system for a hydraulic emergency driving gear function of a motor vehicle automatic transmission and to a method for diagnosing the valve system. An automatic transmission may include the valve system and to a motor vehicle may include the automatic transmission.

BACKGROUND

With respect to an automatic transmission of a motor vehicle, the case can occur, in which a transmission control unit and/or a voltage supply of the automatic transmission fail(s). In this case, there is a need to increase or continue to maintain the vehicle availability with the aid of an emergency driving gear, so that the motor vehicle, for example, can still be moved out of a hazardous situation. In this context, systems including electronic shifting are known, which provide a hydraulic emergency driving gear—before an emergency operation sets in—depending on a transmission position. In the process, the emergency driving gear is hydraulically stored before the emergency operation sets in, but is not activated until the emergency operation sets in.

In addition, systems for a hydraulic emergency driving gear are known, which have a relatively complex configuration, however. In addition, such systems have a disadvantageous effect on the fuel consumption of the motor vehicle, since the leakage losses and the current demand of the automatic transmission are increased due to an appropriate valve system and an actuator system. In addition, the additional valves generate additional costs and an increased installation space requirement in a hydraulic control unit of the automatic transmission.

SUMMARY OF THE INVENTION

Example aspects of the present invention provide a valve system for a hydraulic emergency driving gear function of a motor vehicle automatic transmission, which is as cost-effective and installation space-saving as possible. The valve system makes the hydraulic emergency driving gear function possible without serious disadvantages with respect to fuel consumption.

According to a first example aspect of the invention, a valve system for a hydraulic emergency driving gear function of a motor vehicle automatic transmission is made available. The valve system includes a position valve including a first piston slide and an electromagnetic pressure regulator having a decreasing characteristic curve.

The first piston slide can be brought into a first position and into a second position. The first piston slide is preloaded in the first position. In order to generate the preload, the position valve can include, for example, a spring element.

When the first piston slide is in the second position, the electromagnetic pressure regulator is configured for connecting, preferably via a second piston slide, a system pressure-carrying line of the motor vehicle automatic transmission to a first emergency driving gear clutch of the motor vehicle automatic transmission and to a second and, optionally, a third emergency driving gear clutch of the motor vehicle automatic transmission, whereby the first emergency driving gear clutch and the second and, optionally, the third emergency driving gear clutch are actuated, so that an emergency driving gear of the motor vehicle automatic transmission is engaged.

The position valve is utilized, in particular, for storing a previous history immediately before an activation of the hydraulic emergency driving gear function. In addition, the position valve acts as a hydraulic parameter regarding whether a forward driving gear (for example, a transmission position 1 through 8) was engaged and, therefore, an emergency driving gear is permitted.

In particular, the first emergency driving gear clutch and the second and, optionally, the third emergency driving gear clutch can be brought into a disengaged position and into an engaged position. In the process, it can be provided, in particular, that an emergency driving gear of the motor vehicle automatic transmission is engaged, provided the first emergency driving gear clutch and the second and, optionally, the third emergency driving gear clutch have each been brought into their engaged position. Preferably, it is provided that the first emergency driving gear clutch and the second and, optionally, the third emergency driving gear clutch are hydraulically pressurized only when forward gears of the automatic transmission are engaged.

A "decreasing characteristic curve" of the electromagnetic pressure regulator can be understood, in conjunction with the present invention, in particular, to mean that a hydraulic output pressure of the electromagnetic pressure regulator increases when the electromagnetic pressure regulator is brought out of an energized condition into a non-energized condition. Therefore, the electromagnetic pressure regulator can be utilized for initiating the emergency driving gear when a current supply of the electromagnetic pressure regulator is not available, which can be the case, in particular, in the case of a failure of the transmission control unit and/or of the voltage supply of the automatic transmission. The emergency driving gear can be retained, in the non-energized condition, for as long as it takes for the oil supply of the automatic transmission to be stopped and, as a result, the valves return to initial positions, whereby the stored emergency driving gear is no longer stored.

In one example embodiment, the valve system also includes an emergency operation valve including a second piston slide. The second piston slide can be brought into a first position and into a second position. The second piston slide is preloaded in the first position. When the first piston slide is in the second position, the electromagnetic pressure regulator is hydraulically connected via the position valve to the emergency operation valve and is configured for hydraulically pressurizing the second piston slide in a non-energized condition, so that the second piston slide is brought, against the preload, into the second position, whereby the system pressure-carrying line is connected to the first emergency driving gear clutch and to the second and, optionally, the third emergency driving gear clutch, whereby the first emergency driving gear clutch and the second and, optionally, the third emergency driving gear clutch are actuated, so that the emergency driving gear of the motor vehicle automatic transmission is engaged.

The parts requirement and the necessary installation space can be kept particularly low, due to the fact that the emergency operation valve is omitted. In particular, face ends of clutch valve slides (which were previously hydraulically unused in other configurations) can be utilized as an actuating surface in order to move the clutch valve slide into a position in which the system pressure-carrying line is connected to the first emergency driving gear clutch and to the second and, optionally, the third emergency driving gear clutch.

In this sense, the valve system in a further example embodiment also includes a first clutch valve slide and a second as well as a third clutch valve slide. According to this example embodiment, it is provided that the first clutch valve slide and the second and the third clutch valve slides can each be brought into a first position and into a second position. The first clutch valve slide and the second and the third clutch valve slides are each preloaded in first positions. The preload can be established, for example, with the aid of a spring element within each of the clutch valves.

In addition, when the first piston slide is in the second position, the electromagnetic pressure regulator can hydraulically pressurize the first clutch valve slide and the second and the third clutch valve slides, so that the first clutch valve slide and the second and the third clutch valve slides are each brought, against the preload, into respective second positions, whereby the system pressure-carrying line is connected to the first emergency driving gear clutch and to the second and the third emergency driving gear clutches, whereby the first emergency driving gear clutch and the second and the third emergency driving gear clutches are actuated, so that the emergency driving gear is engaged.

In order to make this activation of the emergency procedure possible, it is provided, in particular, that solenoids of the clutch valves are sealed off as well as possible across a defined gap toward a valve housing of the clutch valves with the aid of additional sealing measures, for example, with an O-ring. In a normal operation, it can be provided that the clutch valve slides are each in the respective preloaded first position in which face ends of the clutch valve slides are connected via the particular position valve to a pressureless tank and, therefore, evacuate. When the first piston slide is in the second position and the current supply of the electromagnetic pressure regulator fails, the pressure regulator can output maximum pressure, which can act upon the clutch valves via the position valve, so that the system pressure-carrying line is connected to the emergency driving gear clutches, which, as a result, are brought, for example, into a respective engaged condition, so that the emergency driving gear is engaged.

The first piston slide can be brought out of the preloaded first position into the second position, for example, with the aid of a hydraulic pressure, wherein the hydraulic pressure is made available, in particular, by an electromagnetic control valve or by one of the emergency driving gear clutches.

In this sense, the valve system can include an electromagnetic control valve, which is hydraulically connected to the position valve and can be configured for hydraulically pressurizing the first piston slide in an energized condition, so that the first piston slide is brought, against the preload, into the second position.

In order to ensure that the storage function of the first piston slide of the position valve brought into the second position is maintained, the pressure signal of the first emergency driving gear clutch or of the second emergency driving gear clutch can be connected, via a hydraulic OR valve, in particular, to a face end of the first piston slide, so that the first piston slide is brought, so to speak, into a "self-hold". This self-hold is utilized, during an activation of the hydraulic emergency driving gear, in particular, in the absence of the pressure signal of the electromagnetic control valve, for continuing to hold the first piston slide for a certain amount of time against the preload of the second position, until the first emergency driving gear clutch and the second and the third emergency driving gear clutches are engaged and, therefore, the emergency driving gear (forward gear) is engaged.

It can therefore be initially ensured, via the pressure signal of the first emergency driving gear clutch or the second emergency driving gear clutch, that the first piston slide is prevented from sliding back, due to the preload force, into the preloaded initial position (first position) due to an absence of the pressure signal of the electromagnetic control valve (in particular due to a failure of its current supply), since the emergency driving gear clutches act as a spring accumulator element and the hydraulic fluid discharged maintains a certain residual pressure in a hydraulic line between the OR valve and the position valve.

In this sense, the valve system can include a hydraulic OR valve, wherein the OR valve can be configured for hydraulically connecting either the first emergency driving gear clutch or the second emergency driving gear clutch to the position valve, so that the first piston slide is held in the second position when the electromagnetic control valve is in a non-energized condition and does not hydraulically pressurize the first piston slide.

The first emergency driving gear clutch can be connected to a first input-side port of the OR valve, the second emergency driving gear clutch can be connected to a second input-side port of the OR valve, and the position valve can be connected to an output-side port of the OR valve. The OR valve can be a change-over ball valve. The OR valve can be configured, in particular, for conveying a piece of pressure information of the first emergency driving gear clutch or the second emergency driving gear clutch to the position valve. When, for example, only the first/second emergency driving gear clutch is hydraulically pressurized, a hydraulic pressure, which is equivalent or proportional to the pressure with which the first/second emergency driving gear clutch is pressurized, can be transmitted to the position valve via the OR valve. The behavior is similar when the first emergency driving gear clutch is pressurized with a higher pressure than the second emergency driving gear clutch, and vice versa.

In addition, the OR valve can be configured for hydraulically connecting either the first emergency driving gear clutch or the second emergency driving gear clutch to the position valve, so that the first piston slide is hydraulically pressurized and moves, against the preload, into the second position. In other words, the first piston slide can be brought, via this example embodiment, into the second position via the pressure level of one of the two emergency driving gear clutches, without the need for a separate electromagnetic control valve for this purpose. This example embodiment allows for a further optimization and/or reduction of the necessary installation space, since an electromagnetic control valve is not necessary. When the electromagnetic control valve is omitted, the first piston slide of the position valve can be designed to be even smaller, so that installation space can be saved in this way as well.

According to a further example embodiment, it is provided that the valve system includes a parking lock valve, wherein the electromagnetic pressure regulator is configured for actuating the parking lock valve when the first piston slide is in the first position. In particular, the electromagnetic pressure regulator can be connected to the parking lock valve via the position valve when the first piston slide is in the preloaded first position, so that the hydraulic pressure generated with the aid of the electromagnetic pressure regulator is connected through by the position valve and acts on the parking lock valve.

In the case of a changeover from the driving gear in the normal operating mode into a "Park" (P), "Reverse" (R), or "Neutral" (N) driving position, the first emergency driving gear clutch and the second emergency driving gear clutch are evacuated against a pre-filling pressure, whereby a pressure support at the position valve for the above-described self-hold ceases. Due to this switching of the position valve into a pressureless condition, the storage function of the position valve can be undone, whereby the electromagnetic pressure regulator is (once again) functionally connected to the parking lock valve and is usable for a parking lock valve function.

The valve system can also include at least one clutch valve for actuating a further clutch (for example, a first clutch valve for actuating a first clutch and a second clutch valve for actuating a second clutch), with the aid of which non-emergency driving gears of the motor vehicle automatic transmission can be engaged, wherein the valve system is configured for connecting the at least one clutch valve to the system pressure-carrying line when the first piston slide and the second piston slide are both in their first position. For example—in a regular operation of the automatic transmission, i.e., when a regular gear (not the emergency driving gear) is engaged and the transmission control and/or the voltage supply of the automatic transmission are/is ensured—the clutch valve can be connected to the system pressure-carrying line via the emergency operation valve when the second piston slide of the emergency operation valve is in the preloaded first position. This is preferably the case when the first piston slide of the position valve is also in the second position.

However, when the emergency driving gear is to be engaged, because the transmission control unit and/or the voltage supply of the automatic transmission have/has failed, the pressure increase at the electromagnetic pressure regulator can bring about an actuating force on the face end of the second piston slide of the emergency operation valve, wherein the actuating force displaces the second piston slide, against the preload, into the second position. As a result, a system pressure supply to the at least one clutch valve can be interrupted via the emergency operation valve, so that, for example, a feed line to the clutch valve is switched to a pressureless condition in the direction of a tank and is evacuated. Therefore, it can be ensured that the further clutch is disengaged and does not have a force-fit connection.

In an alternative example embodiment, the at least one clutch valve can also be permanently connected to the system pressure-carrying line. In this case, a supply of the system pressure to the at least one clutch valve does not take place via a switching function of the emergency operation valve.

In addition, it can be advantageously provided that the electromagnetic pressure regulator is configured for building up a hydraulic pressure in a spring chamber of the position valve, which increases the preload force, which holds the first piston slide in the first position. Provided the first piston slide of the position valve is in the preloaded first position and an unintentional switching of the position valve is to be prevented, a pressure can be applied in the spring chamber via the electromagnetic pressure regulator, whereby an actuation of the position valve via the pressures of the first emergency driving gear clutch or the second emergency driving gear clutch can be prevented, so that the first piston slide remains in the preloaded initial position. As soon as it is desired to store the emergency driving gear during operation, this pressure signal can be switched to a pressureless condition and the position valve can be released.

In addition, it can be advantageously provided that the full hydraulic pressure of the electromagnetic pressure regulator is not applied for locking the first piston slide in the first position, but rather that this pressure can be reduced to a lower pressure level via a pressure divider circuit with the aid, for example, of an orifice into a tank line at a port of the position valve. A possible simplified type of the first piston slide of the position valve is advantageous in this case, whereby the diameter of the position valve can be reduced, since, in particular, an internal spring does not need to be utilized. In this sense, it is provided according to a further example embodiment that the spring chamber is connected to a pressureless tank via an orifice, so that the hydraulic pressure within the spring chamber can be reduced to a lower pressure level.

In a preferred example embodiment of the invention, it is possible that the electromagnetic pressure regulator is hydraulically connected to a fourth port of the position valve and that an eleventh line and, therefore, at least one clutch valve of an emergency driving gear clutch is connected to a third port of the position valve. In addition, the third port is also connected to a tank line via a second pressure divider orifice. In the second switching position of the piston slide, the third port is hydraulically connected to the fourth port, so that, in the case of a pressurization of the third line by the electromagnetic pressure regulator, a flow forms from the electromagnetic pressure regulator to the tank line. In this case, due to the pressure losses at the pressure divider orifices, the pressure in the eleventh line is less than the pressure is between the electromagnetic pressure regulator and the first pressure divider orifice, so that the component load of the clutch valves is also lower.

In one refinement of this example embodiment, a third pressure divider orifice is arranged between at least one of the clutch valves of the emergency driving gear clutches and a certain port of a fifth clutch valve, and a fourth pressure divider orifice is arranged between this certain port and an evacuation or a tank. As a result, the pressure in the certain port of the fifth clutch valve is lower than in at least one of the clutch valves of the emergency driving gear valves. Due to the lower pressure load, the loading of the components is therefore advantageously reduced.

Preferably, the fifth clutch valve is provided for adjusting the pressure in a separating clutch (K0), which is arranged between the internal combustion engine and the transmission.

In an example method for diagnosing a described valve system, starting from the parking lock position, the pressure output by the electromagnetic pressure regulator is increased and, in the case of a measured speed ratio unequal to zero at the torque converter after the parking lock position has been exited after an increase of a clutch pressure acting on the parking lock valve in a disengaging manner, a check is carried out on the basis of a signal of a parking lock sensor to determine whether the piston slide is in the first switching position.

Alternatively, it is provided in a further example method for diagnosing the valve system that, starting from a driving position, a diagnostic path is followed depending on whether a driver demand for an engagement corresponds to the parking lock position, or not.

In the case of a demand for the parking lock position in a first diagnostic path after the evacuation of the emergency driving gear clutches and an electromagnetic switching valve, and an increase of the pressure output by the electromagnetic pressure regulator, a check is carried out on the basis of a signal of a parking lock sensor to determine whether the piston slide is in the first switching position. When a driver demand other than that for the parking lock position is present, then, in a second diagnostic path, a certain waiting time ensues after the engagement of a certain driving position after an increase of the pressure of at least one emergency driving gear clutch via a control pressure of the position valve. After the waiting time has elapsed, the pressure output by the electromagnetic pressure regulator is increased and the emergency driving gear clutch is evacuated. Subsequent thereto, it is established, on the basis of the check of the set transmission ratio, whether the emergency driving gear has been engaged and the piston slide is in the correct switching position.

In an example method for diagnosing at least one other above-described valve system, starting from the parking lock position, the pressure output by the electromagnetic pressure regulator is increased and, in the case of a measured speed ratio unequal to zero at the torque converter after an engagement of a certain driving position, the pressure output by the electromagnetic pressure regulator is increased and the emergency driving gear clutches are evacuated. Subsequent thereto, a check is carried out on the basis of speed signals to determine whether the certain driving position is engaged as an emergency driving gear step, wherein, on the basis of a positive check, it is established whether the piston slide of the position valve is correctly located in the second switching position.

According to a second example aspect of the invention, an automatic transmission for a motor vehicle is made available. The automatic transmission includes a valve system according to the first example aspect of the invention.

According to a third example aspect of the invention, a motor vehicle is made available, which includes an automatic transmission according to the second example aspect of the invention.

BRIEF DESCRIPTION OF THE DRAWINGS

Exemplary embodiments of the invention are explained in greater detail in the following with reference to the diagrammatic drawing, wherein identical or similar elements are provided with the same reference numbers.

Wherein

FIG. 2 shows a gear logic table of a motor vehicle automatic transmission.

DETAILED DESCRIPTION

Figure 1:
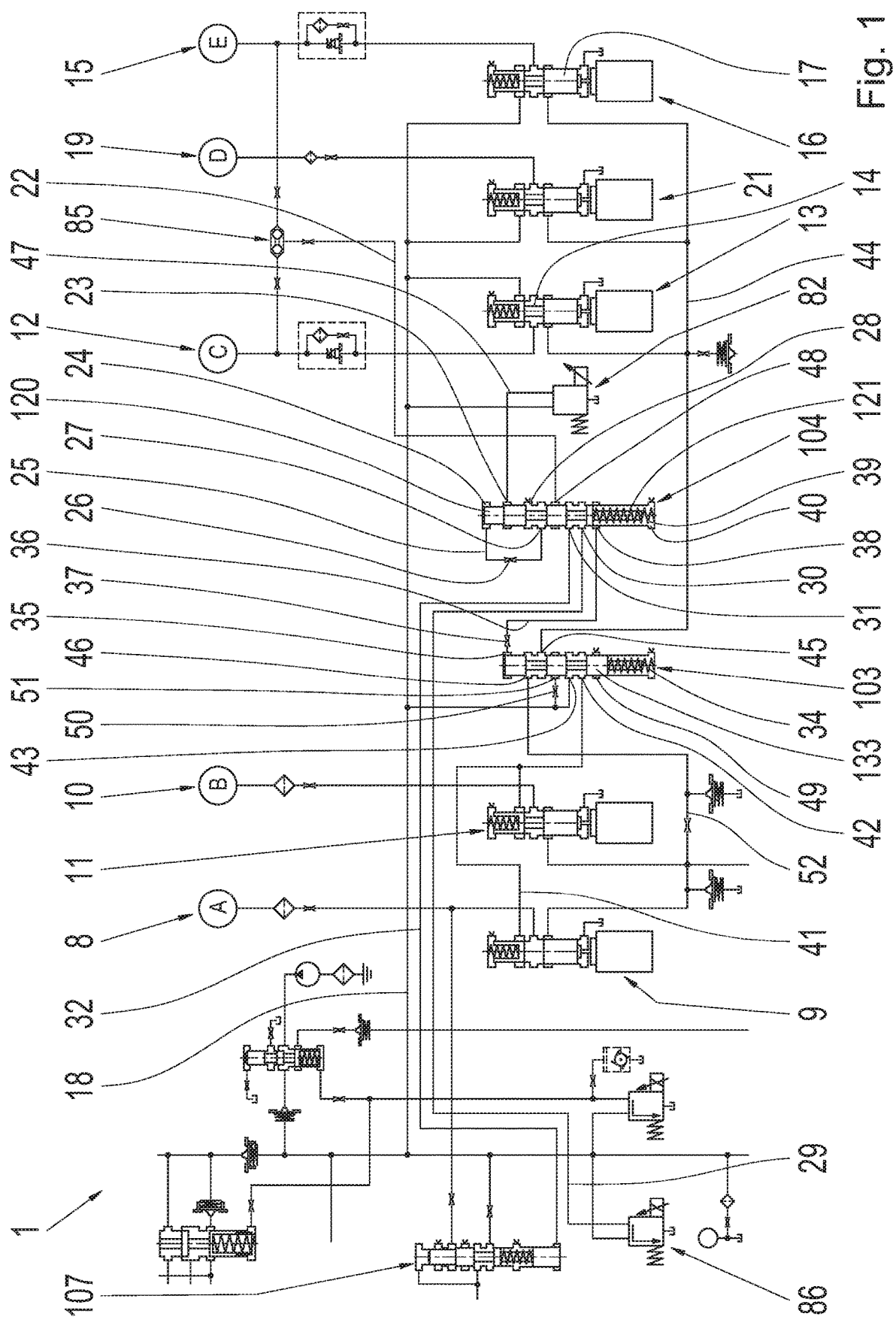
FIG. 1 shows a hydraulic circuit diagram of a first exemplary embodiment of a valve system for a hydraulic emergency driving gear function of a motor vehicle automatic transmission.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a valve system 1 for a hydraulic emergency driving gear function of an automatic transmission for a motor vehicle. The valve system 1 includes an electromagnetic control valve 82, an emergency operation valve 103, a position valve 104, a hydraulic OR valve 85 in the form of a change-over ball valve, an electromagnetic pressure regulator 86 having a decreasing characteristic curve, and a parking lock valve 107. In addition, the valve system 1 includes a first clutch 8, which can be actuated via a first clutch valve 9, and a second clutch 10, which can be actuated via a second clutch valve 11. In addition, the valve system 1 includes a first emergency driving gear clutch 12, which can be actuated via a third clutch valve 13 including a first clutch valve slide 14, and a second emergency driving gear clutch 15, which can be actuated via a fourth clutch valve 16 including a second clutch valve slide 17, and a system pressure-carrying line 18. In addition, the valve system also includes a third emergency driving gear clutch 19 (not described in greater detail), which is actuated by a fifth clutch valve 21.

The hydraulic OR valve 85 is configured for conveying a piece of pressure information of the first emergency driving gear clutch 12 or the second emergency driving gear clutch 15 to the position valve 104. The emergency driving gear clutches 12 and 15 are therefore indicated only in the forward gears 1 through 8 in the shift logic according to FIG. 2 (columns "C" and "E") and are utilized as hydraulic gear information for differentiating the "Drive" (D) position from "Park" (P), "Reverse" (R), and "Neutral" (N). The position valve 104 is utilized for storing the previous history immediately before activation of a hydraulic emergency operation function and also acts as a hydraulic parameter regarding whether a transmission position 1 through 8 was engaged and, therefore, an emergency driving gear (D6) is permitted.

The position valve 104 includes a first piston slide 120, which is preloaded by a first spring element 121 within the position valve 104 in a first position (end stop), which is shown by FIG. 1. The first piston slide 120 can be brought, against the preload, into a second position in the axial direction of the position valve 104. In the first position of the first piston slide 120, in which a face end of the first piston slide 120 is located in a stop of an outer valve pocket at a ninth port 24 of the position valve 104, all transmission clutches can be disengaged and connected to a pre-filling pressure level upon activation of the hydraulic emergency driving gear, i.e., when the voltage supply of all actuators is switched off. The first position of the first piston slide 120 therefore corresponds to a "disengaged transmission" emergency driving gear response starting from an operation of the positions P/R/N.

The position valve 104 is switched to a pressureless condition so that the first piston slide 120 of the position valve 104 remains in this first position. Therefore, the connection of the OR valve 85 via a first line 22 to the ninth port 24 of the position valve 104 is sealed off via the first piston slide 120.

In the ninth port 24 of the position valve 104, a pressure surface on the face end of the first piston slide 120 is evacuated via a second line 25 and via an optional first orifice 26 via a sixth port 27 to a seventh port 28 of the position valve 104 in the direction of a tank and, therefore, is pressureless. The electromagnetic pressure regulator 86 has a decreasing characteristic curve, i.e., in a de-energized condition, the electromagnetic pressure regulator 86 outputs a high pressure. This pressure can be connected through, via a third line 29 to a third port 30 of the position valve 104, to a fourth port 31 of the position valve 104 and can act on the parking lock valve 107 via a fourth line 32.

The emergency operation valve 103 includes a second piston slide 133, which is preloaded by a second spring element 34 within the emergency operation valve 103 in a first position (end stop), which is shown by FIG. 1. An actuating surface on the face end of the second piston slide 133 is connected to a second port 38 of the position valve 104 via a fifth line 36, which is connected to a first port 35 of the emergency operation valve 103 and is provided with an optional second orifice 37. The second port 38 is connected to a first port 40 of the position valve 104 via a spring chamber 39 of the position valve 104 and is evacuated in the direction of a tank and, therefore, is pressureless, so that the second piston slide 133 of the emergency operation valve 103 remains in the first position.

In the first position of the second piston slide 133 shown in FIG. 1, the first clutch valve 9 and the second clutch valve 11 are connected to a sixth port 42 of the emergency operation valve 103 via a sixth line 41. The sixth port 42 is connected, via a fifth port 43 of the emergency operation valve 103, to the system pressure-carrying line 18, and is supplied with pressure. A pre-filling line 44 is connected, on the one hand, to a third port 45 of the emergency operation valve 103 and, on the other hand, to a port of the third clutch valve 13, a port of the fourth clutch valve 16, and a port of the fifth clutch valve 21. The pre-filling line 44 is held at a pre-filling pressure level and the third port 45 of the emergency operation valve 103 is connected to a second port 46 of the emergency operation valve 103.

The electromagnetic control valve 82 is connected to the eighth port 23 of the position valve 104 via a seventh line 47. If a position change now takes place into one of the forward gears 1 through 8, then, for the purpose of storage, the first piston slide 120 of the position valve 104 is displaced into the spring-side stop with the aid of the hydraulic pressure prevailing within the seventh line 47, which is generated by the electromagnetic control valve 82. In order to ensure that the storage function of the displaced first piston slide 120 is not lost, the pressure signal of the first emergency driving gear clutch 12 or of the second emergency driving gear clutch 15 is connected via the OR valve 85 and the first line 22 at a fifth port 48 of the position valve 104 via the sixth pocket 27 of the position valve 104 to a face end of the ninth pocket 24, whereby the first piston slide 120 of the position valve 104 is brought into the so-called "self-hold".

This self-hold is utilized, during an activation of the hydraulic emergency driving gear, in the absence of the pressure signal of the electromagnetic control valve 82, for holding the first piston slide 120 of the position valve 104, having been displaced, against the spring element 121 for a certain amount of time until the emergency driving gear clutches 12, 15, and 19 are engaged and, therefore, the emergency driving gear (forward gear) is engaged.

The pressure signal of the electromagnetic pressure regulator 86 is now diverted from the third pocket 30 of the position valve 104 to the second port 38, which is connected via the fifth line 36 to the pressure surface on the face end of the second piston slide 133 of the emergency operation valve 103. During normal operation, the pressure signal must be evacuated, in a pressureless manner, in the direction of the tank, and the second piston slide 133 of the emergency operation valve 103 must remain in the first position.

During a changeover of the driving position into one of the positions P/R/N, the first emergency driving gear clutch 12 and the second emergency driving gear clutch 15 are evacuated against pre-filling pressure and the pressure support at the position valve 104 for the self-hold function ceases. Therefore, due to the switching of the position valve 104 into a pressureless condition, the storage function of the position valve 104 can be undone, whereby the electromagnetic pressure regulator 86 is also (once again) functionally connected to the parking lock valve 107 and is usable for a parking lock function. Therefore, the hydraulic emergency driving gear is, once more, no longer stored and the automatic transmission would enter the disengaged condition.

When the emergency driving gear is stored, i.e., when the first piston slide 120 is displaced, as described above, into the second position against the spring force, the emergency driving gear is triggered, as described in the following, when the voltage supply of the actuators fails. The actuators are switched to a pressureless condition by switching off the voltage supply of the actuators. One exception in this case is the electromagnetic pressure regulator 86, which, due to the decreasing characteristic curve, outputs a high pressure, which prevails in the third line 29. The first piston slide 120 is prevented from sliding back into the preloaded first position due to the absence of the pressure signal of the electromagnetic control valve 82 initially via the clutch pressure signal of the first emergency driving gear clutch 12 or the second emergency driving gear clutch 15. The emergency driving gear clutches 12 and 15 operate in the manner of a spring accumulator element and the discharging oil maintains a certain residual pressure within the first line 22.

The increased pressure within the third line 29 now brings about—via the fifth line 36 and the first port 35 at the emergency operation valve 103—an actuating force on the face end, which displaces the second piston slide 133 of the emergency operation valve 103, against the preload, into the spring-side stop. As a result, the system pressure supply to the clutch valves 9 and 11 is interrupted via the fifth port 43 and the sixth port 42 of the emergency operation valve 103. The sixth line 41 is switched to a pressureless condition and evacuated in the direction of the tank via a seventh port 49 of the emergency operation valve 103. Therefore, it is ensured that the first clutch 8 and the second clutch 10 are disengaged and do not have a force-fit connection.

The system pressure-carrying line 18 is connected via an optional third orifice 50 to a fourth port 51 of the emergency operation valve 103 and is contacted toward the third port 43 with the pre-filling line 44. Simultaneously, a further pre-filling line 52 of the first clutch 8 and of the second clutch 10 at the second port 46 of the emergency operation valve 103 is decoupled in the direction of the third port 45. Therefore, the emergency driving gear clutches 12, 15, and 19 are supplied with system pressure via the pre-filling line 44 and are engaged, whereby the emergency driving gear is engaged. The emergency driving gear is retained, in the non-energized condition, for as long as it takes for the oil supply of the automatic transmission to be stopped and, as a result, the valves return to their initial position, whereby the stored emergency driving gear is no longer stored.

Figure 3:
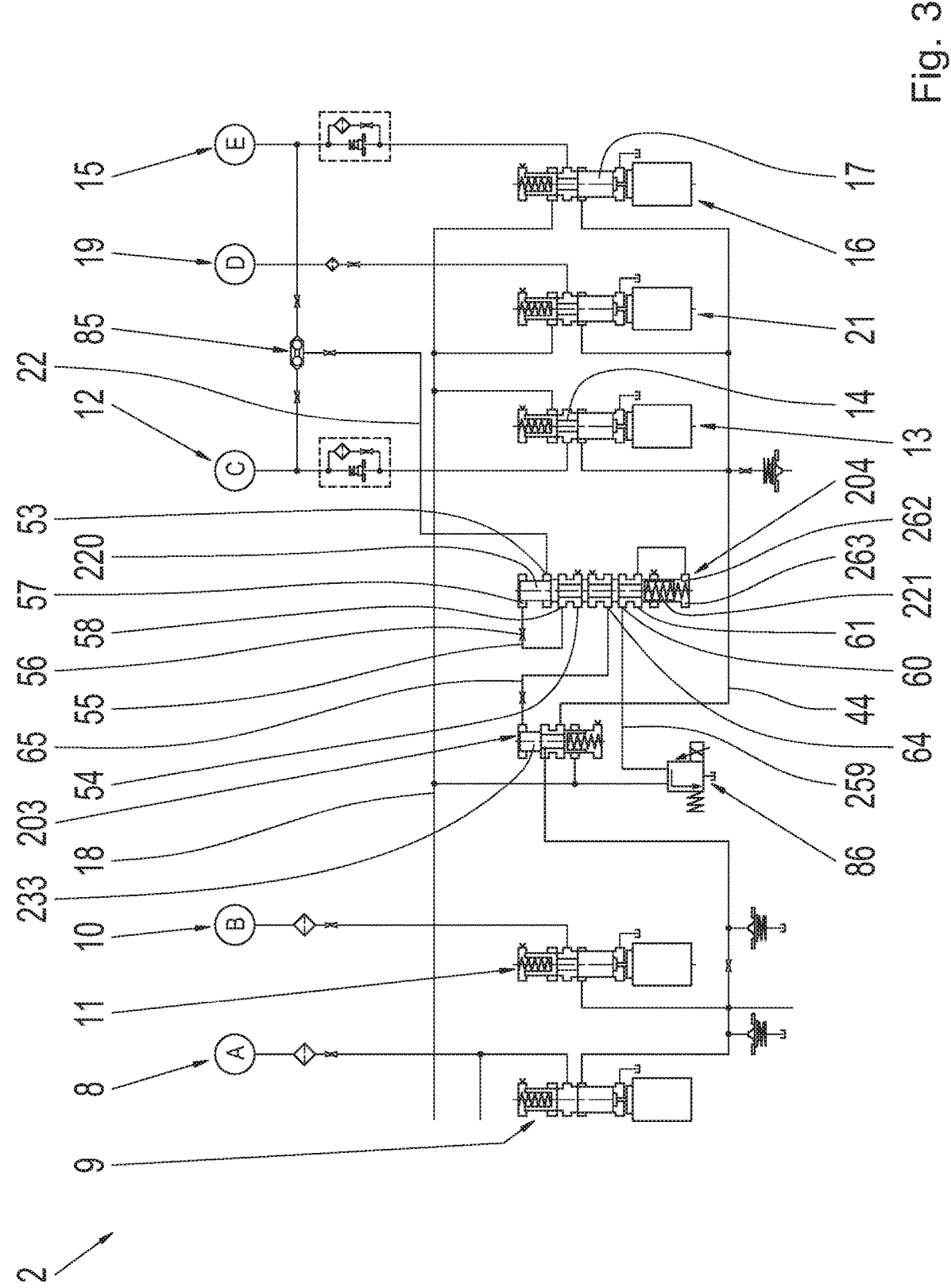
FIG. 3 shows a hydraulic circuit diagram of a second exemplary embodiment of a valve system for a hydraulic emergency driving gear function of a motor vehicle automatic transmission.

The valve system 2 according to FIG. 3 differs from the valve system 1 according to FIG. 1, in particular, due to the fact that the system pressure supply to the clutch valves 9 and 11 does not take place with the aid of the switching function of an emergency operation valve 103 and via the sixth line 41 (cf. FIG. 1), which is not present in the exemplary embodiment according to FIG. 3. Instead, the clutch valves 9 and 11 according to the exemplary embodiment according to FIG. 3 are permanently and directly connected to the system pressure-carrying line 18.

A position valve 204 is replaced in the exemplary embodiment according to FIG. 3 by a valve, which has been optimized with respect to installation space. A first piston slide 220 of the position valve 204 is not brought into the second position with the aid of a separate electromagnetic control valve. This electromagnetic control valve is omitted according to the exemplary embodiment according to FIG. 3. Instead, the first piston slide 220 of the position valve 204 in the exemplary embodiment according to FIG. 3 is brought into the second position via the pressure level of one of the two emergency driving gear clutches 12 or 15.

The clutch pressure of the OR valve 85 acts at a ninth port 53 of the position valve 204 on a differential area of the piston slide 220, wherein this differential area is formed via two different diameters of two piston collars of the first piston slide 220. Since the pressure acts on a relatively small area, a very high clutch pressure is required in order to displace the first piston slide 220 of the position valve 204 against the spring force. This clutch pressure is set to be so high that an inadvertent actuation of the valve 204 can be prevented. When the clutch pressure is sufficiently high, the first piston slide 220 of the position valve 204 moves against the spring force and closes an evacuation port 54, which had previously evacuated—in a pressureless manner, in the direction of a tank—an eighth line 55 including an optional fourth orifice 56 to a face end at a tenth port 57 of the position valve 204 via a connection to an eighth control pocket 58.

In the meantime, the eighth control pocket 58 is acted upon by the pressure signal-conducting ninth port 53 of the emergency driving gear clutches 12 and 15, so that the clutch pressure can now also act, on the face end, on the large control surface of the first piston slide 220, and the position valve 204 and/or the first piston slide 220 switch(es) into a self-hold. Due to the increase in area, the self-hold pressure is only a fraction of the control pressure. The electromagnetic pressure regulator 86 having a decreasing characteristic curve is now utilized for actuating the emergency operation valve 203 and the position valve 204. In contrast to the exemplary embodiment according to FIG. 1, according to the exemplary embodiment according to FIG. 3, there is no connection between the electromagnetic pressure regulator 86 and the parking lock valve.

Provided the first piston slide 220 of the position valve 204 remains in the first position and an unintentional switching of the position valve 204 is to be prevented, a pressure in a spring chamber 262 of a first port 263 can be connected via the electromagnetic pressure regulator 86 via a ninth line 259 to a fourth port 60 of the position valve 204 via the third port 61, whereby the first piston slide 220 of the position valve 204 is no longer actuatable via the clutch pressures of the emergency driving gear clutches 12 and 15 and remains in the first position. As soon it is desired to store the emergency driving gear during operation, the pressure signal generated by the electromagnetic pressure regulator 86 is switched to a pressureless condition and, in this way, the first piston slide 220 of the position valve 204 is released.

If a pressure build-up takes place via the electromagnetic pressure regulator 86 in the ninth line 259 when the first piston slide 220 has been displaced against the spring force, which is the case, for example, during an activation of the hydraulic emergency driving gear, the pressure at the fourth port 60 of the position valve 204, which has been generated within the ninth line 259 by the pressure regulator 86, is connected via its fifth port 64 via a tenth line 65 to the face end of the second piston slide 233 of the emergency operation valve 203. As a result, the emergency operation valve 203 connects the system pressure supply (system pressure-carrying line 18) to the pre-filling line 44 and, therefore, engages the emergency driving gear clutches 12, 15, and 19, which corresponds to the engagement of the emergency driving gear.

Figure 4:
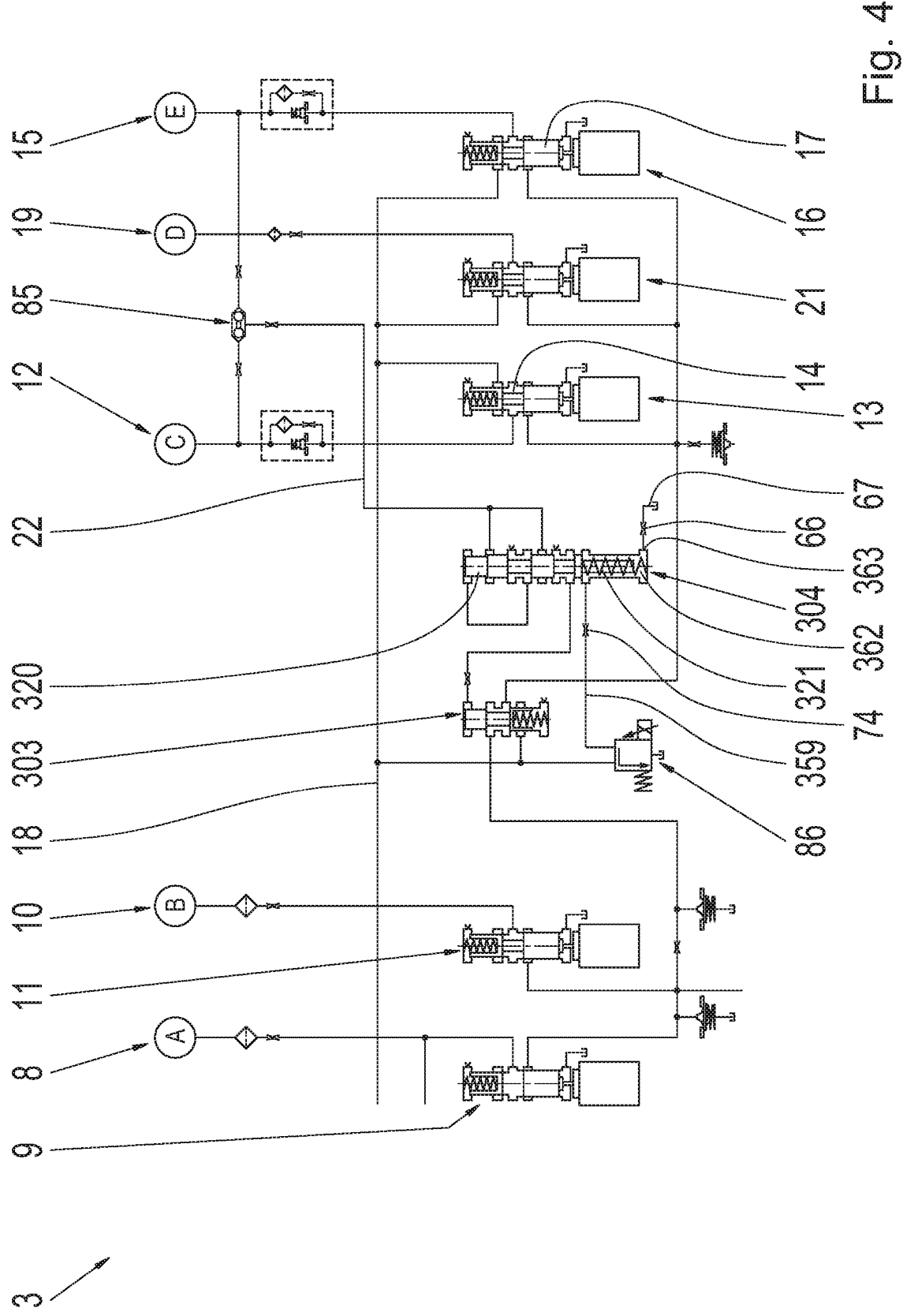
FIG. 4 shows a hydraulic circuit diagram of a third exemplary embodiment of a valve system for a hydraulic emergency driving gear function of a motor vehicle automatic transmission.

The valve system 3 according to FIG. 4 is a modification of the valve system 1 according to FIG. 3. In the exemplary embodiment according to FIG. 4, in particular, a further embodiment of a position valve 304 is shown, wherein not all of the pressure generated by the pressure regulator 86 within the ninth line 359 and within the spring chamber 362 is connected in order to lock a first piston slide 320 of the position valve 304 in the initial position (first position). Instead, this pressure can be reduced to a lower pressure level via a pressure divider circuit with the aid of a fifth orifice 66 in a tank line 67 at the first port 363 of the position valve 304, i.e., in the pass-through direction downstream from the spring chamber 362, and an optional sixth orifice 369 in the ninth line 359 in the feed-in port to the spring chamber 362. As a result, the type of the first piston slide 320 of the piston valve 304 can be simplified, whereby the diameter of the position valve 304 can be reduced, since an internal spring does not need to be utilized.

Figure 5:
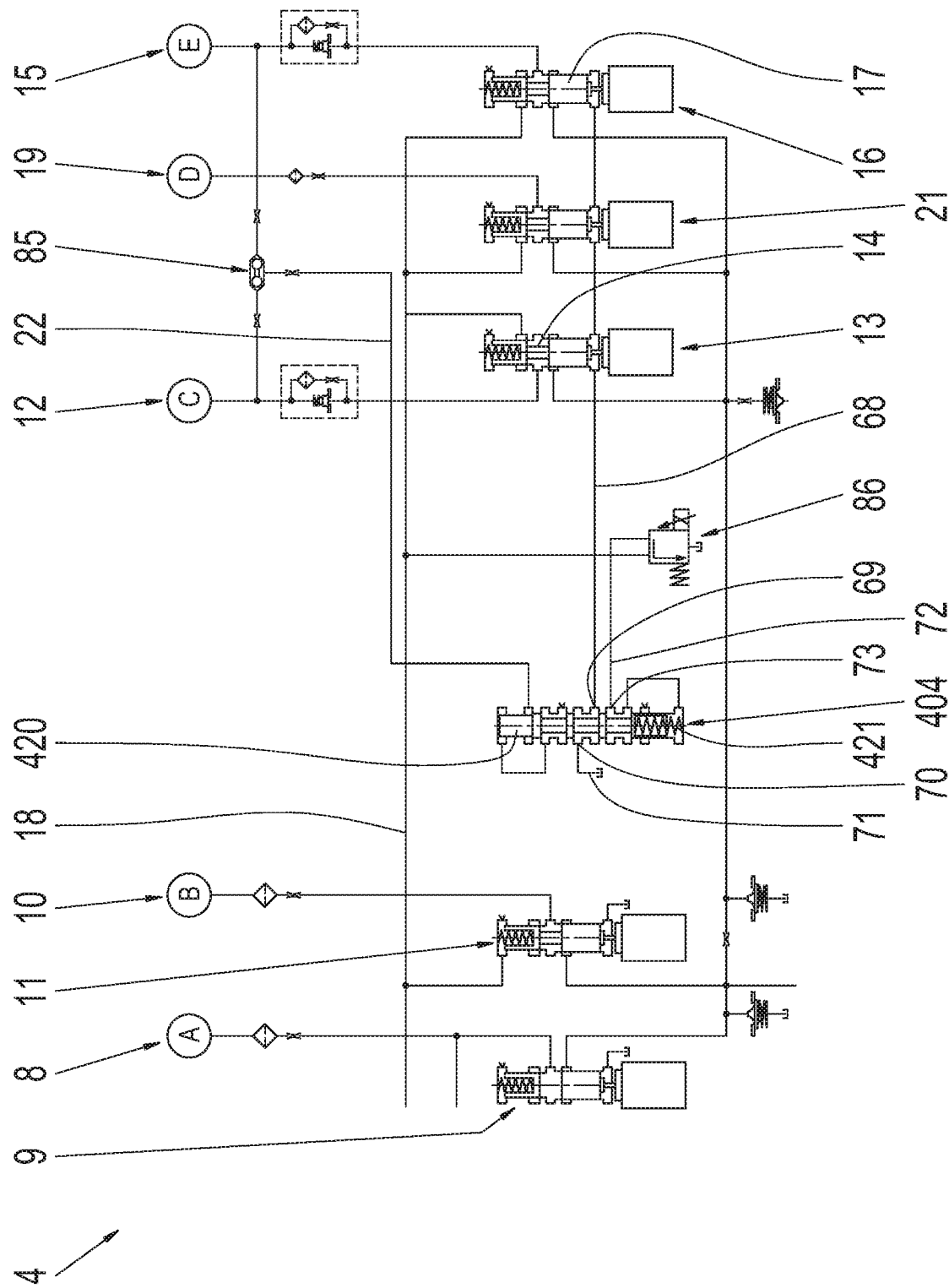
FIG. 5 shows a hydraulic circuit diagram of a fourth exemplary embodiment of a valve system for a hydraulic emergency driving gear function of a motor vehicle automatic transmission.

In the example embodiment of the valve system 4 according to FIG. 5, the parts requirement and the installation space are reduced once again, since an emergency operation valve is not provided. The actuation of a first piston slide 420 of a position valve 404 takes place in a manner similar to that of the exemplary embodiment according to FIG. 3 via the clutch pressures of the emergency driving gear clutches 12 and 15. Likewise, the first piston slide 420 can be blocked in the initial position (first position) via a pressurization with the aid of the electromagnetic pressure regulator 86 having a decreasing characteristic curve.

The valve system 4 makes it possible for the previously hydraulically unused face ends, in particular, of the first clutch valve slide 14 and of the second clutch valve slide 17, to be utilized as an actuating surface in order to activate the hydraulic emergency driving gear. In order make this possible, solenoids, in particular, of the third clutch valve 13 and of the fourth clutch valve 16 are sealed off as well as possible across a defined gap toward a housing of the particular clutch valve 13 or 16 with the aid of additional sealing measures, for example, with an O-ring.

During normal operation, the face ends of these clutch valve slides 14 and 17 are connected to a tank line 71 and are evacuated via an eleventh line 68 via the position valve 404 at the fifth port 69 to the sixth port 70. If the hydraulic emergency driving gear is activated when the first piston slide 420 of the position valve 404 has been displaced into the second position, the electromagnetic pressure regulator 86 outputs maximum pressure, which is connected via a twelfth line 72 at a fourth port 73 of the position valve 404 to the fifth port 69. Therefore, the clutch valves 13 and 16 are activated, whereby the emergency driving gear clutches 12 and 15 are engaged and the emergency driving gear is engaged. The aforementioned comments also apply similarly for the emergency driving gear clutch 19.

Figure 6:
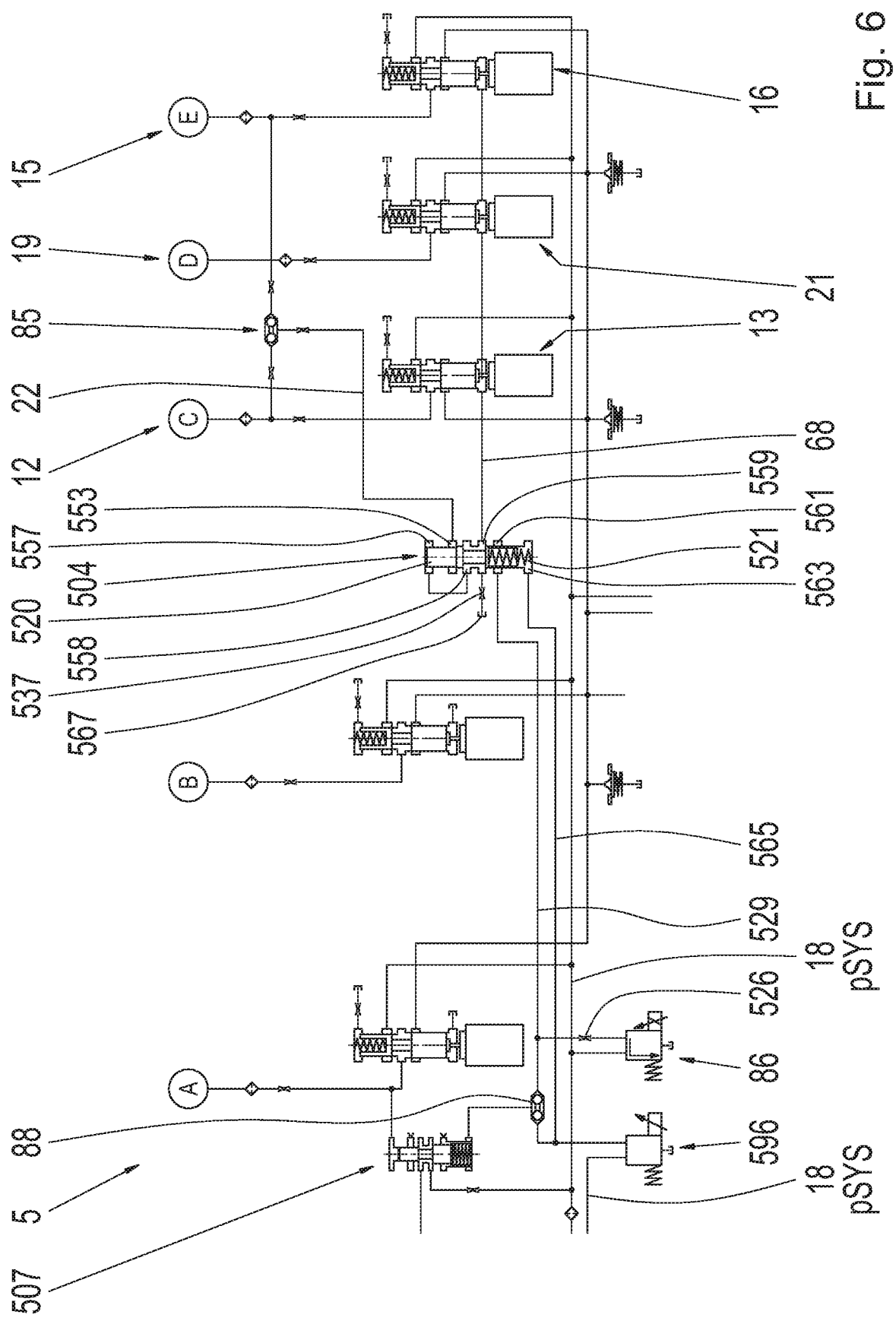
FIG. 6 shows a hydraulic circuit diagram of a fifth exemplary embodiment of a valve system for a hydraulic emergency driving gear function of a motor vehicle automatic transmission.

FIG. 6 shows a valve system 5 in a cutout of a hydraulic circuit diagram. The valve system 5 includes a position valve 504, an electromagnetic pressure regulator 86, and a parking lock solenoid valve 596, and can dispense with an emergency operation valve, as is the case with the valve system 4. The position valve 504 includes a piston slide 520, which, during normal operation, is pressed into a first switching position by a spring element 521. The position valve 504 includes six ports 557, 553, 558, 559, 561, and 563. The port 557 is connected to the port 558 by a line. The port 553, which is formed axially between the ports 557 and 558, is connected to the OR valve 85 via the line 22, whereby the piston slide 520 can be acted upon by the pressure of the emergency driving gear clutch 12 or 15. The port 559 is connected to a tank line 567 via a second orifice 537 and, therefore, is evacuated, i.e., is connected to a pressureless area and/or the oil sump. The eleventh line 68, which connects the clutch valves 13 and 16 as well as the clutch valve 21 of the third emergency driving gear clutch 19, is also evacuated through the port 559 in the first switching position of the piston slide 520, similarly to the normal operation of the valve system 4 in FIG. 5.

The actuation of a first piston slide 520 of the position valve 504 takes place similarly to the exemplary embodiments according to FIGS. 3 and 4 via the clutch pressures of the emergency driving gear clutches 12 and 15 from the hydraulic OR valve 85. If the selector lever position P has been engaged, the parking lock solenoid valve 596 is energized and the pressure of the parking lock solenoid valve 596 acts on a parking lock valve 507 as well as via a line 565 and the port 563 on the side of the piston slide 520 on which the force of the spring 521 acts. Therefore, the piston slide 520 assumes the first switching position represented in FIG. 6.

If the driving position D has been selected and, therefore, either the first emergency driving gear clutch 12 or the second emergency driving gear clutch 15 is engaged and, therefore, pressurized, the clutch pressure pC or pE acts via the OR valve 85 and the line 22 on the piston slide 520. The force of the spring 521 and the areas of the piston slide 520 are selected in such a way that the pressure pC of the emergency driving gear clutch 12 or a pressure pE of the emergency driving gear clutch 15, which acts in the port 553 on the piston slide 520 against the force of the spring 521, suffices to displace the piston slide 520, against the force of the spring 521, into a second stop position. Via a line between a port 558 and 553, the clutch pressure pC or pE also acts on the face end of the piston slide 520, so that the piston slide 520 is in the self-hold condition. If the current in the transmission control unit now fails, the port 563 is evacuated through the line 565 and through a parking lock solenoid valve 595, so that the pressure in the region of the spring 521 drops to an ambient pressure p0.

Due to the power failure, the pressure output by the electromagnetic pressure regulator 86 increases simultaneously with the evacuation of the parking lock solenoid valve 596 and, therefore, the line 565, since the electromagnetic pressure regulator 86 has a decreasing pressure-current characteristic curve and outputs a high pressure when current is low. The pressure in the line 529 increases and also pressurizes, via the port 561, the eleventh line 68 and, therefore, acts on the clutch valve slide 14 and 17 of the clutch valves 13 and 16 and on the clutch valve 21 of the third emergency driving gear clutch 19. As a result, all three emergency driving gear clutches 12, 15, and 19 are pressurized and, therefore, engaged, so that the sixth gear is engaged.

An existing separating clutch K0 is disengaged, in this case, in the de-energized condition of the automatic transmission, so that travel takes place purely electrically.

In the second switching position of the piston slide 520, the orifices 526 and 537 form a pressure divider, so that the pressure in the eleventh line 68 is lower as compared to the valve system 4 in FIG. 5 and, therefore, the component load of the clutch valves of the emergency driving gear clutches 12, 15, and 19 is also lower.

If an emergency driving gear is not active, the pressure load on the eleventh line 68 from the clutch valves 13, 16, and 21 is reduced.

The parking lock solenoid valve 596 and the electromagnetic pressure regulator 86 are redundant with respect to the activation of the parking lock valve 507, since the pressure of the electromagnetic pressure regulator 86 acts via an OR valve 88 on the parking lock valve 507, so that a substitute signal is present in the case of a failure of the parking lock solenoid valve 596. In order to secure the parking lock valve position in the end position (position P) represented in FIG. 6, this can be secured against unintentional activation after position "nicht_P" via the pressure of the electromagnetic pressure regulator 86. If this pressure would not be present, due to an error, the pressure of the parking lock solenoid valve 596 acts redundantly via the OR valve 88 on the spring chamber of the parking lock valve 507 and performs the securing function.

In the emergency driving gear, travel can only take place electrically, because a separating clutch K0 (not represented) is disengaged and, therefore, propulsion with the aid of the internal combustion engine is not possible.

Figure 7:
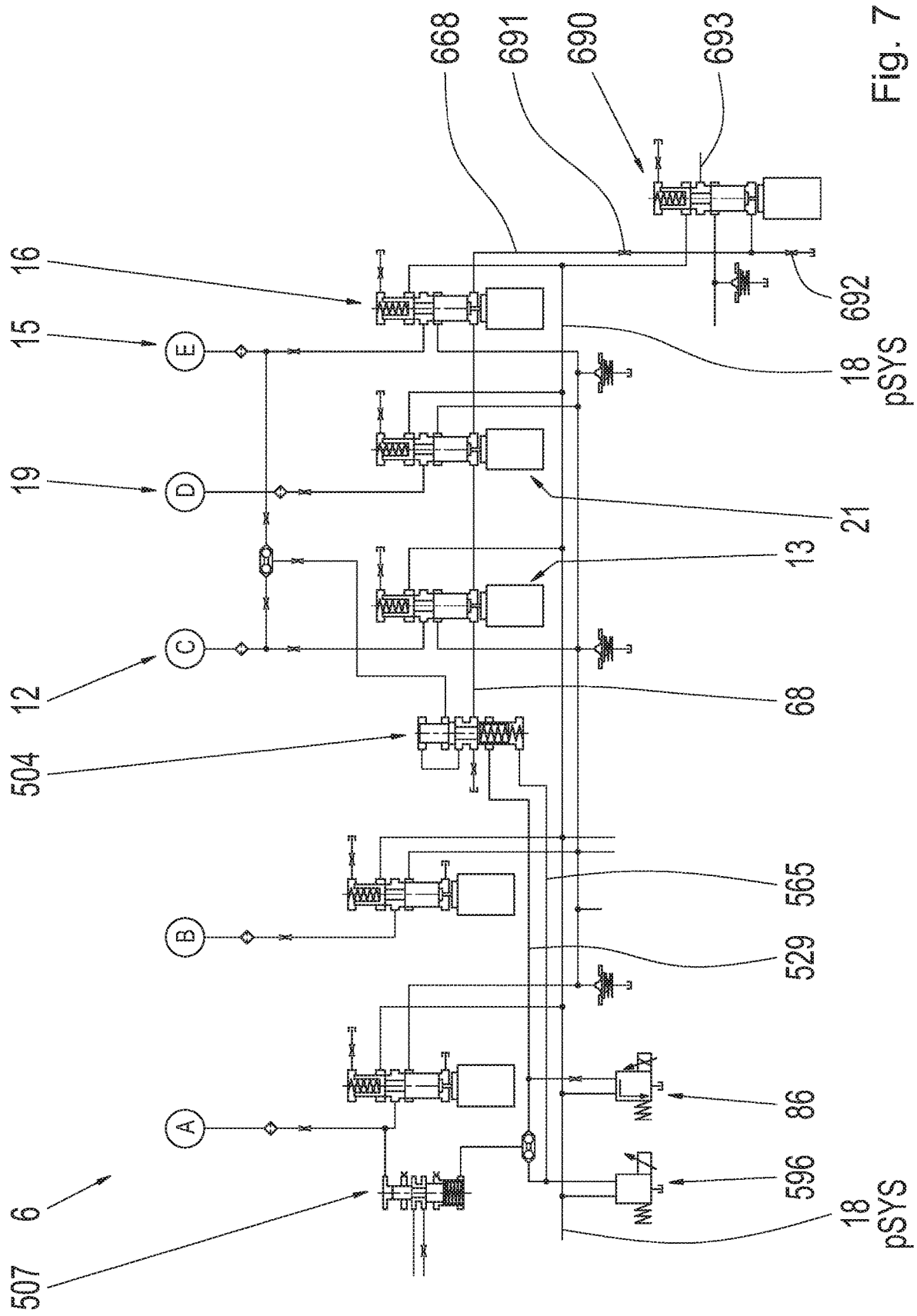
FIG. 7 shows a hydraulic circuit diagram of a sixth exemplary embodiment of a valve system for a hydraulic emergency driving gear function of a motor vehicle automatic transmission.

FIG. 7 shows, in a cutout of a hydraulic circuit diagram, a valve system 6, which differs from the configuration of the valve system 5 from FIG. 6 in that the line 68 through the clutch valves of the emergency driving gear clutches 12, 15, and 19 is extended by a line 668 up to into a clutch valve 690 of the separating clutch K0. The clutch valve 690 is connected to the separating clutch K0 (not shown) by a port 693. Due to the pressurization of the lines 68 and 668, the separating clutch K0 is also engaged when the emergency driving gear D6 is engaged. Driving with the aid of an internal combustion engine is possible only when the automatic transmission includes a hydrodynamic torque converter. The pressure at the separating clutch K0 can be less than the clutch pressures of the clutches 12, 15, and 19. If a pressure divider including two orifices 691 and 692 is provided at the clutch valve 690 of the separating clutch K0, the pressure drops in the line 668 between the orifices 691 and 692 and in the clutch valve 690 as well as in the separating clutch K0 and, therefore, the load of the corresponding components drops.

Figure 8:
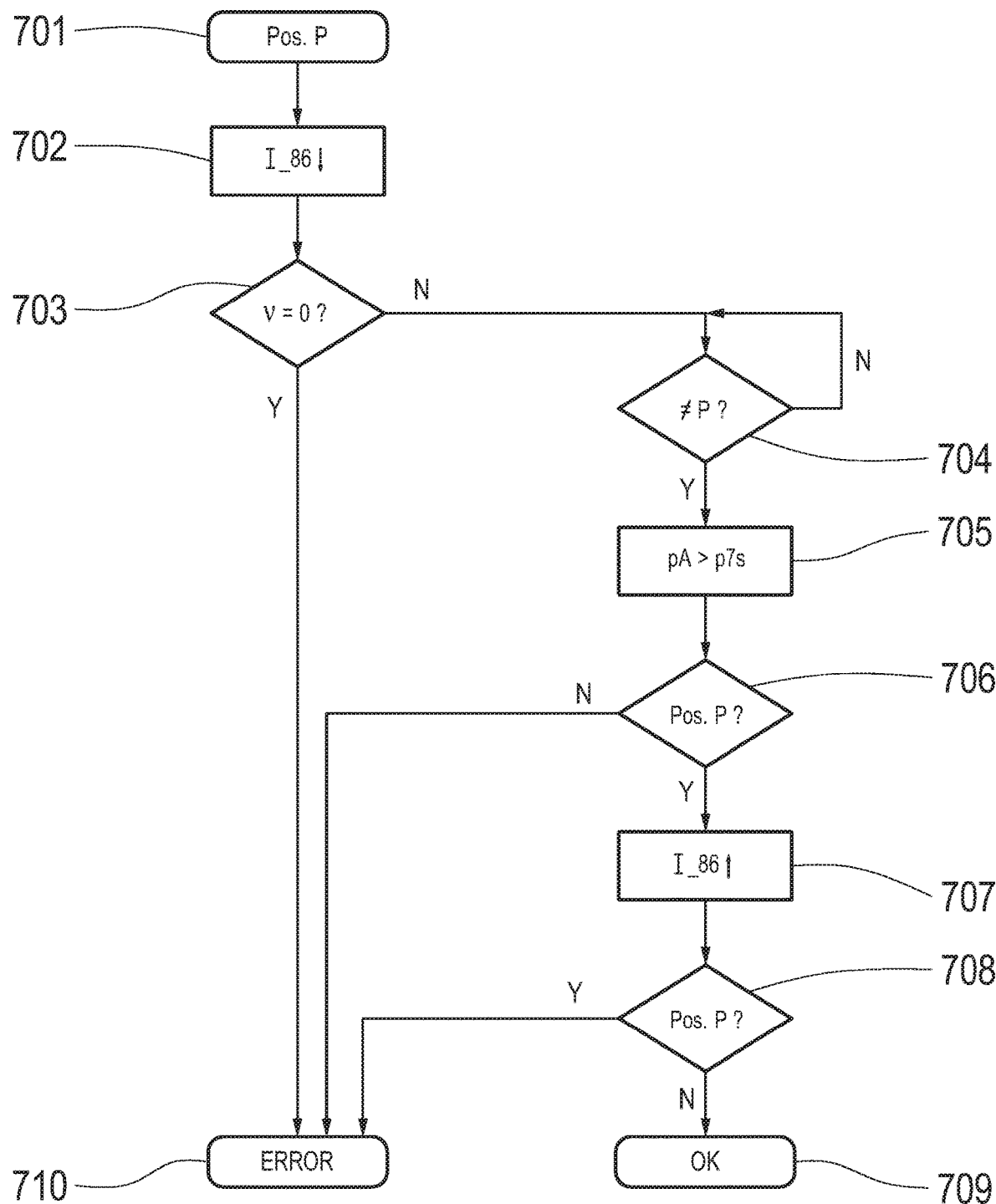
FIG. 8 shows a flow chart of an example diagnostic method for a valve system configured according to the first exemplary embodiment.

FIG. 8 shows a flow chart of an example diagnostic method for the valve system 1 in FIG. 1. The valve system 1 includes, as described with reference to FIG. 1, the electromagnetic pressure regulator 86, the position valve 104, the emergency operation valve 103, and the electromagnetic control valve 82. In order to check whether the valve system 1 in position P is in a deactivated position, i.e., an emergency driving gear D6 is not activated, the following diagnostic sequence in position P is provided.

In a start step 701, the parking lock position P is engaged. In an operation step 702, the pressure output by the electromagnetic pressure regulator 86 is increased by reducing a pressure regulator current 1_86. With the aid of a speed sensor system, the speed ratio nue, which is also referred to as converter slip, is observed as the ratio of turbine speed with respect to impeller speed (nue=nT/nP) for a decision step 703. If the emergency driving gear D6 is erroneously activated in position P, i.e., the piston slide 120 is in the second switching position, then this, in combination with the regularly pressurized clutches 8 and 10, results in a blocked transmission gear set, whereby the turbine speed nT is reduced to 0 rpm and, therefore, the speed ratio becomes nT/nP=0. The result 710, therefore, is an error (not specified in greater detail) in the emergency operation valve system, which is communicated to the driver as a transmission error and is handled with the aid of appropriate substitute measures. A substitute measure can be a limited transmission function or, as is recommended in this case, a fixation of the vehicle in position P.

However, if no force-fit connection in the automatic transmission is detectable via the speed ratio nue, i.e., nue=nT/nP is unequal to zero or 0<nT/nP<1, the next diagnostic steps take place only once the position P has been exited, due to driver demand, which is queried in a decision step 704. If the parking lock position P is exited due to driver demand, then, for diagnostic purposes, in deviation from the normal sequence, the clutch 8 is brought to a clutch pressure pA—in an operation step 705 with de-energized electromagnetic pressure regulator 86—which is higher than a control pressure p7s of the parking lock valve 7, and the signal of the parking lock position sensor is evaluated for a decision step 706. The control pressure p7s is to be understood to be a pressure value at which the parking lock valve 7 is brought into a switching position in which the parking lock is disengaged. If the parking lock is disengaged, i.e., the position P is exited, an error is present as result 710. If the parking lock remains in the position P within a defined window, the function of the emergency operation system according to the position P is error-free up to that point and the diagnostic function can be continued in an operation step 707, in that the parking lock is checked for disengagement by switching off the electromagnetic pressure regulator 86 into an energized condition. The time window depends on various parameters, essentially, for example, oil temperature, system pressure level, and pressure level clutch 8, and is stored as a characteristic map. If it is detected, in a decision step 708, by the parking lock position sensor, that the position P has been exited, the result 709 is that the valve system is in order. If the parking lock remains engaged, the result 710 is that there is an error in the emergency operation valve system.

Figure 9:
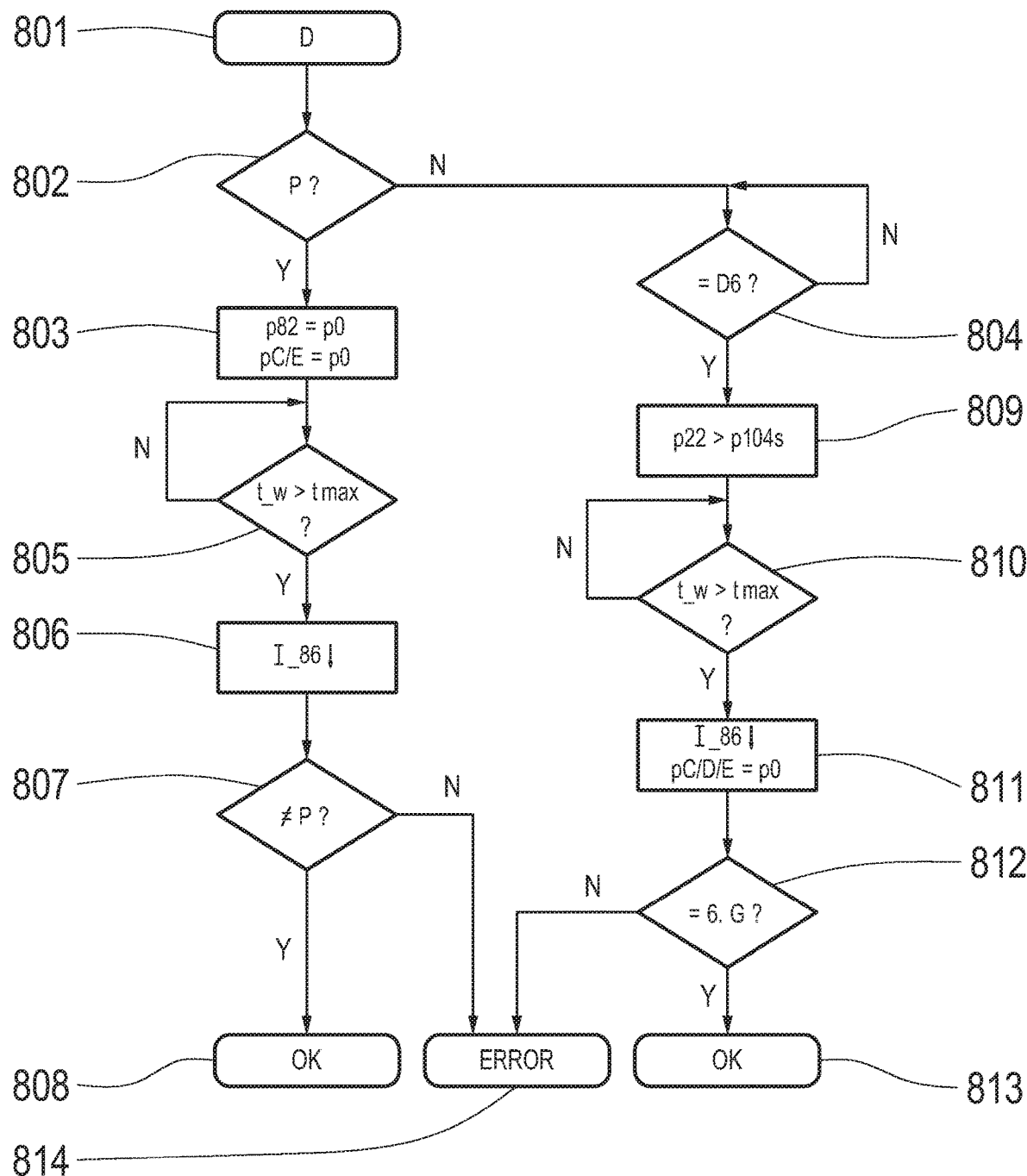
FIG. 9 shows a flow chart of a further example diagnostic method for a valve system configured according to the first exemplary embodiment.

FIG. 9 shows a flow chart of a further example diagnostic method for a valve system 1. It is assumed, in this case, that a position D is present in a start step 801. If, in a decision step 802, the driver demand now corresponds to the engagement of the position P, an evacuation of the electromagnetic control valve 82 as well as of the emergency driving gear clutches 12 and 15 takes place in an operation step 803, so that the piston slide 120 of the position valve 104 is displaced into the first switching position. If this has taken place after a certain waiting time, the electromagnetic pressure regulator 86 is de-energized in an operation step 806, so that a pressure increase takes place in the line 29, whereby the parking lock valve 7 is pressurized via the line 32 and, as a result, the parking lock is engaged.

If this is detected in a decision step 807 on the basis of the signal of the parking lock position sensor, the result 808 is that the valve system 1 is in order and/or the piston slide 120 is in the first switching position. If a signal change does not take place in the parking lock valve 7, the result 814 is that an error in the emergency operation system has been detected.

The position of the piston slide 120 of the position valve 104 in the initial position is automatically also monitored every time the parking lock is engaged via pressurization of the electromagnetic pressure regulator 86. A precondition therefor is a sufficient pressure supply in the system, which is usually the case when the parking lock is engaged with the internal combustion engine running or with the electrical additional oil pump (IEP) running. In addition, it can be assumed that the position P is engageable only via actuation of the brake pedal, i.e., the driver presses on the brake with a foot and can intervene in the event of a failure.

If the piston slide 120 of the position valve 104 has been erroneously pushed into the second switching position, which can be the case, for example, due to jamming resulting from soiling or an erroneously pressurized electrical switching valve 82, a pressurization of the electromagnetic pressure regulator 86 does not bring about the desired engagement of the parking lock, which can be monitored with the aid of the parking lock position sensor, but rather results in the triggering of the hydraulic emergency driving gear D6, since, due to the malposition of the piston slide 120 of the position valve 104 in the second switching position, the emergency operation valve 103 is connected, via the line 36, to the working pressure line 29 of the electromagnetic pressure regulator 86 and is actuated. A precondition in this case is that the usual draining time of the clutches 12 and 15 has elapsed and, therefore, the hydraulic self-hold of the position valve 104 is no longer ensured. Therefore, if a position change is not reported back at the parking lock position sensor after pressurization of the electromagnetic pressure regulator 86 within a defined time window, there is an error in the emergency operation valve system 1.

The time window depends on various parameters, essentially, for example, oil temperature, system pressure level, and pressure level clutch 8, and is stored as a characteristic map.

If the driver demand in the decision step 802 does not correspond to the engagement of the parking lock or the position P, a check is carried out in a decision step 804 to determine whether the position D6 is desired. A second diagnostic path is then carried out (Y) starting from the decision step 804 only in the force-locking driving position D6. Initially, it is ensured that the piston slide 120 remains in the second switching position, displaced against the force of the spring 121, in that, in an operation step 809, at least one of the two clutch pressures pC or pE, which is operative in the line 22 as line pressure p22, is controlled to a pressure level above a holding pressure p104s for the position valve 104. After an elapsed waiting time in a decision step 810, the electromagnetic pressure regulator 86 is actuated to output pressure, in an operation step 811, in that the current l_86 is reduced, and at least one of the drive clutches C, D, or E of the sixth gear is actuated in a pressureless manner. Under the effect of the pressure generated by the electromagnetic pressure regulator, the emergency operation valve 103 would now have to be located in the second switching position against the force of the spring 34, so that the clutches 12, 15, and 19 are engaged via the pressure in the line 44, even when their clutch valves are de-energized. If the speed ratio between the drive speed and the output speed now corresponds to the ratio of the sixth gear, the emergency operation valve system is in order. Otherwise, an error is present, which is appropriately handled further via driver notification and substitute measures.

Figure 10:
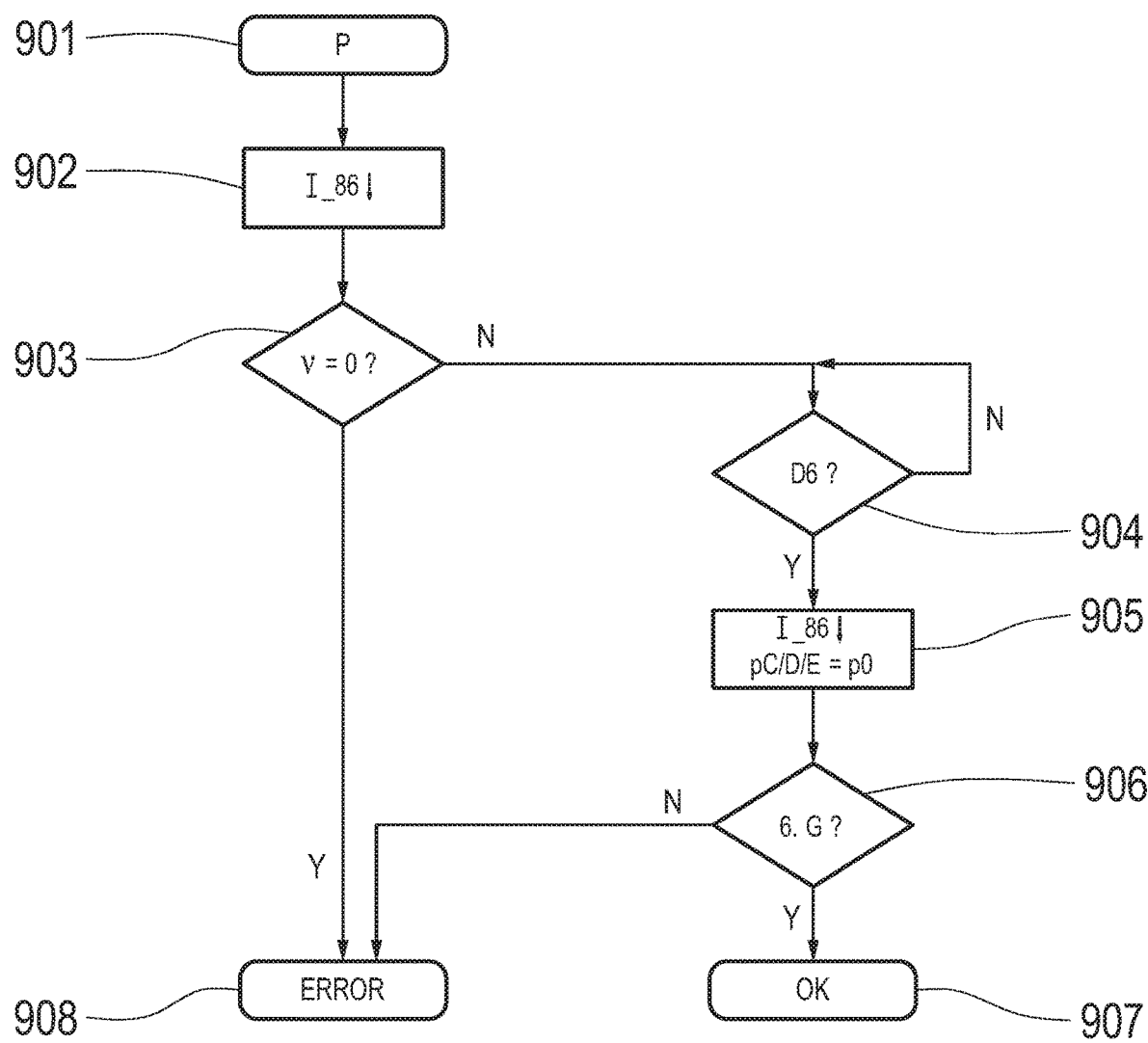
FIG. 10 shows a flow chart of an example diagnostic method for valve systems configured according to further exemplary embodiments.

FIG. 10 shows a flow chart of an example diagnostic method for a valve system 5 or 6. Starting from a start step 901 in which the position P is engaged, the pressure downstream from the electromagnetic pressure regulator 586 in the line 529 is increased, in an operation step 902, in that the current l_586 of the electromagnetic pressure regulator 586 is reduced or switched off. In a decision step 903, it is ascertained, on the basis of the signals of turbine speed nT and impeller speed nP, whether the speed ratio nT/nP is equal or unequal to zero. If the speed ratio is zero, this means the automatic transmission is blocked, in that at least three shift elements are engaged. This yields a result 908, that there is an error in the emergency operation valve system.

If there is no significant differential speed at the hydrodynamic torque converter, the next diagnostic steps take place only when position D6 is engaged, according to a decision step 904.

In the event of a position change after D, a pressure is applied to one of the clutches 12 or 15, which is higher than the control pressure of the position valve 504 and, therefore, the emergency driving gear is hydraulically stored. If the gear position D6 has been reached, in which the clutches 12, 19 and 15 (C, D and E) are engaged, the electromagnetic pressure regulator 586 is pressurized in an operation step 905 and the clutches 12, 19, and 15 are controlled, in the actuating pressure, toward disengagement via the pressure control of the appropriate pressure regulator. This can take place in a ramp-like manner or abruptly, wherein the ramp-like manner would be less perceptible by a driver and, therefore, less noticeable, in the presence of an error. In a decision step 906, the ratio of the transmission input speed with respect to the transmission output speed is now evaluated. If this corresponds to the ratio of the sixth gear, the result 907 is that the emergency operation system is in order. In the case of a ratio deviating therefrom, the result 908 is to assume there is an error, which is handled further according to driver notification and substitute measures.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS 1 valve system
2 valve system
3 valve system
4 valve system
5 valve system
6 valve system
8 first clutch
9 first clutch valve
10 second clutch
11 second clutch valve
12 first emergency driving gear clutch
13 third clutch valve
14 first clutch valve slide
15 second emergency driving gear clutch
16 fourth clutch valve
17 second clutch valve slide
18 system pressure-carrying line
19 third emergency driving gear clutch
21 fifth clutch valve
22 first line
23 eighth port of the position valve
24 ninth port of the position valve
25 second line
26 first orifice
27 sixth port of the position valve
28 seventh port of the position valve
29 third line
30 third port of the position valve
31 fourth port of the position valve
32 fourth line
34 second spring element
35 first port of the emergency operation valve
36 fifth line
37 second orifice
38 second port of the position valve
39 spring chamber within the position valve
40 first port of the position valve
41 sixth line
42 sixth port of the emergency operation valve
43 fifth port of the emergency operation valve
44 pre-filling line
45 third port of the emergency operation valve
46 second port of the emergency operation valve
47 seventh line
48 fifth port of the position valve
49 seventh port of the emergency operation valve
50 third orifice
51 fourth port of the emergency operation valve
52 further pre-filling line
53 ninth port of the position valve
54 evacuation port
55 eighth line
56 fourth orifice
57 tenth port of the position valve
58 eighth control pocket of the position valve
60 fourth port of the position valve
61 third port of the position valve
64 fifth port of the position valve 65 tenth line
66 fifth orifice
67 tank line
68 eleventh line
69 fifth port of the position valve
70 sixth port of the position valve
71 tank line
72 twelfth line
73 fourth port of the position valve
74 orifice
82 electromagnetic control valve
85 hydraulic OR valve
88 hydraulic OR valve
103 emergency operation valve
104 position valve
107 parking lock valve
120 first piston slide
121 first spring element
133 second piston slide
186 electromagnetic pressure regulator
203 emergency operation valve
204 position valve
220 first piston slide
221 first spring element
233 second piston slide
259 ninth line
262 spring chamber within the position valve
263 first port of the position valve
286 electromagnetic pressure regulator
303 emergency operation valve
304 position valve
320 first piston slide
321 first spring element
359 ninth line
362 spring chamber within the position valve
363 first port of the position valve
404 position valve
420 first piston slide
421 first spring element
504 position valve
507 parking lock valve
520 first piston slide
521 first spring element
526 first pressure divider orifice
529 third line
537 second pressure divider orifice
557 first port of position valve
558 second port of position valve
559 third port of position valve
561 fourth port of position valve
563 fifth port of position valve
565 tenth line
567 tank line
586 electromagnetic pressure regulator
596 parking lock solenoid valve
629 third line
665 tenth line
668 thirteenth line
690 clutch valve of separating clutch K0
691 third pressure divider orifice
692 fourth pressure divider orifice
693 line K0
701 start step
702 operation step
703 decision step
704 decision step
705 operation step
706 decision step
707 operation step
708 decision step
709 result
710 result
801 start step
802 decision step
803 operation step
804 decision step
805 decision step
806 operation step
807 decision step
808 result
809 operation step
810 decision step
811 operation step
812 decision step
813 result
814 result
901 start step
902 operation step
903 decision step
904 decision step
905 operation step
906 decision step
907 result
908 result
I_86 current of electromagnetic pressure regulator 86
nP impeller speed (hydrodynamic torque converter)
nT turbine speed (hydrodynamic torque converter)
p_0 ambient pressure, pressureless condition
pA clutch pressure A of clutch 8
pC clutch pressure C of the emergency driving gear clutch 12
pD clutch pressure D of the emergency driving gear clutch 19
pE clutch pressure E of the emergency driving gear clutch 15
pSYS system pressure
nue speed ratio nue=nT/nP

The invention claimed is:
1. A valve system for a hydraulic emergency driving gear function of a motor vehicle automatic transmission, comprising:
a position valve (104) with a first piston slide (120);
an electromagnetic pressure regulator (86) having a decreasing characteristic curve; and
an OR valve (85),
wherein the first piston slide (120) is movable into a first position and into a second position, and the first piston slide (120) is preloaded in the first position,
wherein, when the first piston slide (120) is in the second position, the electromagnetic pressure regulator (86) is configured for connecting a system pressure-carrying line (18) of the motor vehicle automatic transmission to at least one first emergency driving gear clutch (12) of the motor vehicle automatic transmission and to a second emergency driving gear clutch (15) of the motor vehicle automatic transmission such that the first emergency driving gear clutch (12) and the second emergency driving gear clutch (15) are actuated to engage an emergency driving gear of the motor vehicle automatic transmission, and
wherein the OR valve (85) is configured for hydraulically connecting either the first emergency driving gear clutch (12) or the second emergency driving gear clutch (15) to the position valve (104) such that the first piston slide (120) is hydraulically pressurized and moves into the second position against the preload.

2. The valve system of claim 1, further comprising an emergency operation valve (103) with a second piston slide (133), wherein:
the second piston slide (133) is movable into a first position and into a second position, and the second piston slide (133) is preloaded in the first position; and
when the first piston slide (120) is in the second position, the electromagnetic pressure regulator (86) is hydraulically connected to the emergency operation valve (103) via the position valve (104) and is configured for hydraulically pressurizing the second piston slide (133) in a non-energized condition such that the second piston slide (133) moves into the second position against the preload to connect the system pressure-carrying line (18) to the first emergency driving gear clutch (12) and to the second emergency driving gear clutch (15), whereby the first emergency driving gear clutch and the second emergency driving gear clutch are actuated to engage the emergency driving gear of the motor vehicle automatic transmission.

3. A valve system for a hydraulic emergency driving gear function of a motor vehicle automatic transmission, comprising:
a position valve (104) with a first piston slide (120);
an electromagnetic pressure regulator (86) having a decreasing characteristic curve;
a third clutch valve (13) with a first clutch valve slide (14); and
at least one fourth clutch valve (16) with a second clutch valve slide (17),
wherein the first piston slide (120) is movable into a first position and into a second position, and the first piston slide (120) is preloaded in the first position,
wherein, when the first piston slide (120) is in the second position, the electromagnetic pressure regulator (86) is configured for connecting a system pressure-carrying line (18) of the motor vehicle automatic transmission to at least one first emergency driving gear clutch (12) of the motor vehicle automatic transmission and to a second emergency driving gear clutch (15) of the motor vehicle automatic transmission such that the first emergency driving gear clutch (12) and the second emergency driving gear clutch (15) are actuated to engage an emergency driving gear of the motor vehicle automatic transmission,
wherein the first clutch valve slide (14) and the second clutch valve slide (17) are each moveable into a respective first position and into a respective second position, and the first clutch valve slide (14) and the second clutch valve slide (17) are each preloaded in the respective first position, and
wherein, when the first piston slide (120) is in the second position, the electromagnetic pressure regulator (86) is hydraulically connected at least to the third clutch valve (13) and to the fourth clutch valve (16) and is configured for hydraulically pressurizing the first clutch valve slide (14) and the second clutch valve slide (17) in a non-energized condition such that each of the first clutch valve slide (14) and the second clutch valve slide (17) move into the respective second position against the preload to connect the system pressure-carrying line (18) at least to the first emergency driving gear clutch (12) and to the second emergency driving gear clutch (15), whereby the first emergency driving gear clutch (12) and the second emergency driving gear clutch (15) are actuated to engage the emergency driving gear.

4. A valve system for a hydraulic emergency driving gear function of a motor vehicle automatic transmission, comprising:
a position valve (104) with a first piston slide (120);
an electromagnetic pressure regulator (86) having a decreasing characteristic curve; and
an electromagnetic control valve (82),
wherein the first piston slide (120) is movable into a first position and into a second position, and the first piston slide (120) is preloaded in the first position,
wherein, when the first piston slide (120) is in the second position, the electromagnetic pressure regulator (86) is configured for connecting a system pressure-carrying line (18) of the motor vehicle automatic transmission to at least one first emergency driving gear clutch (12) of the motor vehicle automatic transmission and to a second emergency driving gear clutch (15) of the motor vehicle automatic transmission such that the first emergency driving gear clutch (12) and the second emergency driving gear clutch (15) are actuated to engage an emergency driving gear of the motor vehicle automatic transmission,
wherein the electromagnetic control valve (82) is hydraulically connected to the position valve (104) and configured for hydraulically pressurizing the first piston slide (120) in an energized condition such that the first piston slide (120) moves into the second position against the preload.

5. The valve system of claim 4, further comprising a hydraulic OR valve (85), the OR valve (85) configured for hydraulically connecting either the first emergency driving gear clutch (12) or the second emergency driving gear clutch (15) to the position valve (104) such that the first piston slide (120) is held in the second position when the electromagnetic control valve (82) is in a non-energized condition and does not hydraulically pressurize the first piston slide (120).

6. A valve system for a hydraulic emergency driving gear function of a motor vehicle automatic transmission, comprising:
a position valve (104) with a first piston slide (120);
an electromagnetic pressure regulator (86) having a decreasing characteristic curve;
a parking lock valve (107),
wherein the first piston slide (120) is movable into a first position and into a second position, and the first piston slide (120) is preloaded in the first position,
wherein, when the first piston slide (120) is in the second position, the electromagnetic pressure regulator (86) is configured for connecting a system pressure-carrying line (18) of the motor vehicle automatic transmission to at least one first emergency driving gear clutch (12) of the motor vehicle automatic transmission and to a second emergency driving gear clutch (15) of the motor vehicle automatic transmission such that the first emergency driving gear clutch (12) and the second emergency driving gear clutch (15) are actuated to engage an emergency driving gear of the motor vehicle automatic transmission,
wherein the electromagnetic pressure regulator (86) is configured for actuating the parking lock valve (107) when the first piston slide (120) is in the first position.

7. The valve system of claim 2, further comprising at least a first clutch valve (9) or a second clutch valve (11) for actuating a further clutch (8, 10) for engaging non-emergency driving gears of the motor vehicle automatic transmission, wherein the valve system is configured for connecting the first clutch valve (9) or the second clutch valve (11) to the system pressure-carrying line (18) when the first piston slide (120) and the second piston slide (133) are both in the first position, respectively.

8. The valve system of claim 1, further comprising at least a first clutch valve (9) or a second clutch valve (11) for actuating a further clutch (8, 10) for engaging non-emergency driving gears of the motor vehicle automatic transmission, wherein the first clutch valve (9) or the second clutch valve (11) is permanently connected to the system pressure-carrying line (18).

9. The valve system of claim 1, wherein the electromagnetic pressure regulator (86) is configured for building up a hydraulic pressure in a spring chamber (262) of the position valve (204) to increase the preload force holding the first piston slide (220) in the first position.

10. The valve system of claim 9, wherein the spring chamber (362) is connected via at least one orifice (66) to an unpressurized tank such that the hydraulic pressure within the spring chamber (362) is lowerable to a lower pressure level.

11. The valve system of claim 10, wherein an orifice (74) is arranged in a line (359) between the spring chamber (362) and the electromagnetic pressure regulator (86).

12. The valve system of claim 1, wherein:
the electromagnetic pressure regulator (86) is hydraulically connected to a fourth port (561) of the position valve (504);
an eleventh line (68) and at least one clutch valve (13, 16, 21) of an emergency driving gear clutch (12, 15, 19) are connected to a third port (559) of the position valve (504);
the third port (559) also connected to a tank line (567) via a second pressure divider orifice (537);
in the second switching position of the first piston slide (520), the third port (559) is connected to the fourth port (561) such that, during a pressurization of the third line (529) by the electromagnetic pressure regulator (86), a flow forms from the electromagnetic pressure regulator (86) to the tank line (567); and
due to pressure losses at a first pressure divider orifice (526) and the second pressure divider orifice (537), the pressure in the eleventh line (68) is lower than the pressure between the electromagnetic pressure regulator (86) and the first pressure divider orifice (526).

13. The valve system of claim 12, wherein a third pressure divider orifice (691) is arranged at least between one of the clutch valves (13, 16, 21) of the emergency driving gear clutches (12, 15, 19) and a certain port of a fifth clutch valve (690), and a fourth pressure divider orifice (692) is arranged between the certain port of the fifth clutch valve (690) and an evacuation or a tank such that the pressure in the certain port of the fifth clutch valve (690) is less than in at least one of the clutch valves (13, 16, 21) of the emergency driving gear valves (12, 15, 19).

14. The valve system of claim 13, wherein the fifth clutch valve (690) is configured for adjusting the pressure in a separating clutch (K0).

15. A method for diagnosing a valve system for a hydraulic emergency driving gear function of a motor vehicle automatic transmission, the valve system includes a position valve (104) with a first piston slide (120) and an electromagnetic pressure regulator (86) having a decreasing characteristic curve, the first piston slide (120) is movable into a first position and into a second position, the first piston slide (120) is preloaded in the first position, the electromagnetic pressure regulator (86) is configured for connecting a system pressure-carrying line (18) of the motor vehicle automatic transmission to at least one first emergency driving gear clutch (12) of the motor vehicle automatic transmission and to a second emergency driving gear clutch (15) of the motor vehicle automatic transmission when the first piston slide (120) is in the second position such that the first emergency driving gear clutch (12) and the second emergency driving gear clutch (15) are actuated to engage an emergency driving gear of the motor vehicle automatic transmission, the method comprising:
starting from a parking lock position (P), increasing the pressure output by the electromagnetic pressure regulator (86); and
when a measured speed ratio (nue=nT/nP) at the torque converter is unequal to zero after exiting the parking lock position (P) and increasing a clutch pressure acting on the parking lock valve (107) in a disengaging manner, performing a check based on a signal of a parking lock sensor to determine whether the first piston slide (120) is in the first switching position.

16. A method for diagnosing a valve system for a hydraulic emergency driving gear function of a motor vehicle automatic transmission, the valve system includes a position valve (104) with a first piston slide (120) and an electromagnetic pressure regulator (86) having a decreasing characteristic curve, the first piston slide (120) is movable into a first position and into a second position, the first piston slide (120) is preloaded in the first position, the electromagnetic pressure regulator (86) is configured for connecting a system pressure-carrying line (18) of the motor vehicle automatic transmission to at least one first emergency driving gear clutch (12) of the motor vehicle automatic transmission and to a second emergency driving gear clutch (15) of the motor vehicle automatic transmission when the first piston slide (120) is in the second position such that the first emergency driving gear clutch (12) and the second emergency driving gear clutch (15) are actuated to engage an emergency driving gear of the motor vehicle automatic transmission, the method, comprising:
starting from a driving position (D), following a particular diagnostic path depending on whether a driver demand for an engagement corresponds to a parking lock position (P) or not;
as part a first diagnostic path in response to a demand for the parking lock position (P) after evacuation of at least one emergency driving gear clutch (12, 15) and the electromagnetic control valve (82) and after increasing the pressure output by the electromagnetic pressure regulator (86), performing a check based on a signal of a parking lock sensor to determine whether the first piston slide (120) is in the first switching position; and
as part a second diagnostic path in response to a demand other than for the parking lock position (P) after engagement of a certain driving position (D6) and after increasing the pressure of the emergency driving gear clutch (12, 15) above a control pressure of the position valve (104) and after increasing the pressure output by the electromagnetic pressure regulator (86) and after evacuating at least one emergency driving gear clutch (12, 15), performing a check of a set transmission ratio in the motor vehicle automatic transmission to determine whether the first piston slide (120) is in the first switching position.

17. A method for diagnosing the valve system of claim 1, comprising:
- starting from a parking lock position (P), increasing the pressure output by the electromagnetic pressure regulator (86); and
- when a measured speed ratio (nue=nT/nP) at the torque converter is unequal to zero after engaging a certain driving position (D6) and after increasing the pressure output by the electromagnetic pressure regulator (86) and after evacuating the emergency driving gear clutches (12, 15, 19), performing a check to determine whether the certain driving position (D6) is engaged as an emergency driving gear step,
- wherein a positive check establishes that the piston slide (520) of the position valve (504) is correctly in the second switching position.

18. A motor vehicle automatic transmission, comprising the valve system of claim 1.

19. A motor vehicle, comprising the motor vehicle automatic transmission of claim 18.

* * * * *